INVENTORS.
WILLIAM R. FOWLER, JR.
BY BOBBY R. MCGILL
ATTORNEYS

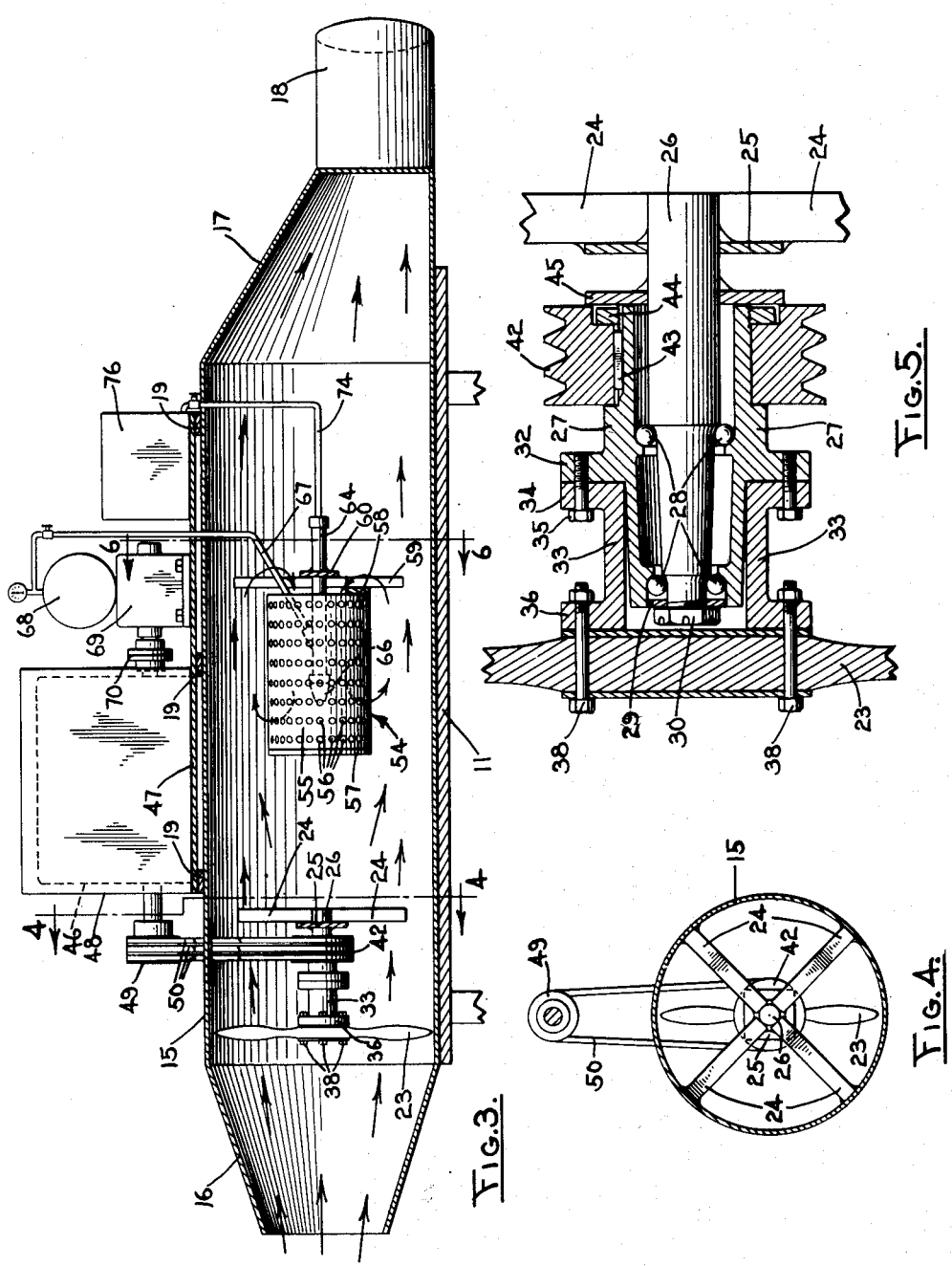

Patented Nov. 10, 1953

2,658,308

UNITED STATES PATENT OFFICE 2,658,308

CROP HEATING DEVICE FOR PREVENTING FROST DAMAGE

William R. Fowler, Jr., and Bobby R. McGill, Selma, Calif.; said McGill assignor to said Fowler, Jr.

Application March 8, 1949, Serial No. 80,182

4 Claims. (Cl. 47—2)

This invention relates to heating devices and more particularly to crop heaters adapted to maintain field temperatures above critical temperatures for various crops, such as are frequently needed in fruit and nut orchards, truck gardens, and the like.

In that branch of horticulture devoted to the propagation of marketable crops of vegetables, fruits and nuts there are seasonably recurring threats of killing frosts that damage the trees or other plants and of somewhat lighter frosts of sufficient effect to damage blossoms or produce. In order to reduce damage and to eliminate it where possible, various methods and apparatus have been devised for use in raising the temperature of the air in an orchard or field threatened by freezing temperatures or frost.

A well known method of heating the air in orchards employs smudge pots which effect a raising of temperature where they are used. Smudge pots are tedious and laborious to operate, it being necessary to employ a great number for effective operation which must be ignited and replenished with fuel frequently. Further they are a source of soot and other dirt which lowers the quality of the produce it is desired to protect and are productive of a dirty atmosphere generally objectionable from health, cleanliness, and visibility considerations.

Various other forms of heaters have been devised for maintaining the temperature in an orchard or field above freezing. Most of these are inefficient in their operation and expensive to employ. There are also available, blowers which circulate the air to prevent frost damage but these are also expensive to operate and are ineffective over a large area.

Therefore, it is an object of the present invention to provide improved means for minimizing damage to tender crops and plants incident to frost.

Another object is to provide a crop heater for effectively raising the temperature in orchards and fields.

Another object is to provide an orchard and field heater having an improved source of heat possessing desired efficeincy characteristics and improved means for distributing the heat emanating from the source.

Another object is to provide a crop heater that is readily portable so that it may be expeditiously moved to a location where it is most needed and/or circulated over an area as needed.

Further objects are to provide improved elements and arrangements thereof in a device of the character described that is durable, economical, and dependable in its operation.

Still further objects and advantages will become apparent in the subsequent description in the specification.

In the drawings:

Fig. 3 is an enlarged, fragmentary, longitudinal, vertical, sectional view through the heater, illustrating the interior thereof.

Fig. 4 is a transverse sectional view through the heater, as taken along line 4—4 in Fig. 3.

Fig. 5 is a further enlarged, fragmentary, longitudinal, sectional view through the fan mounting structure of the heater.

Figure 1:
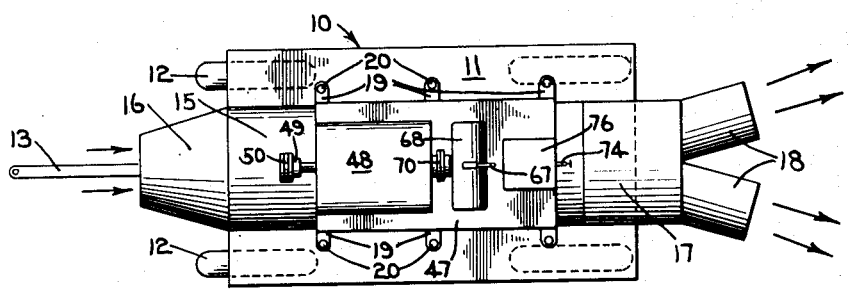
Fig. 1 is a top plan view of a crop heater showing the construction of the present invention.
Figure 2:
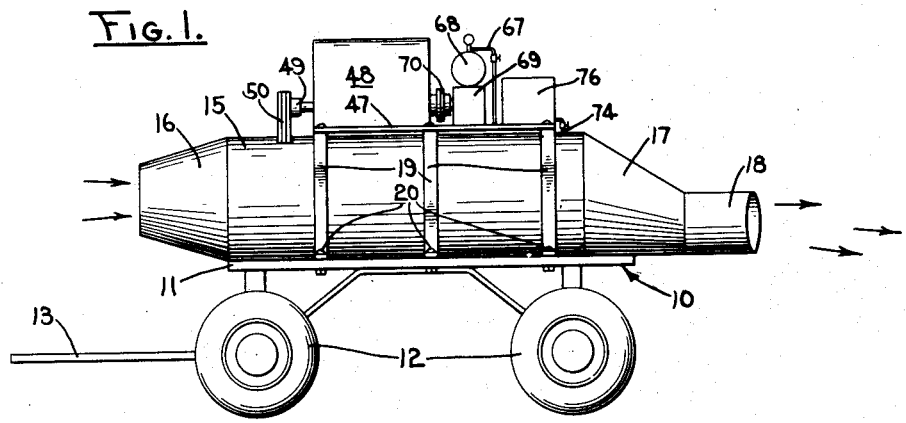
Fig. 2 is a side elevational view of the heater.
Figure 6:
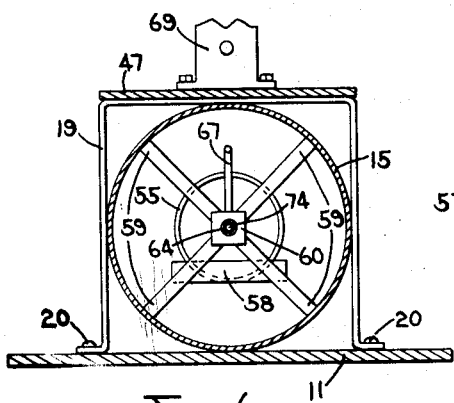
Fig. 6 is a vertical, transverse, sectional view through a portion of the heater illustrating the heater unit mounting, as taken along line 6—6 in Fig. 3.
Figure 7:
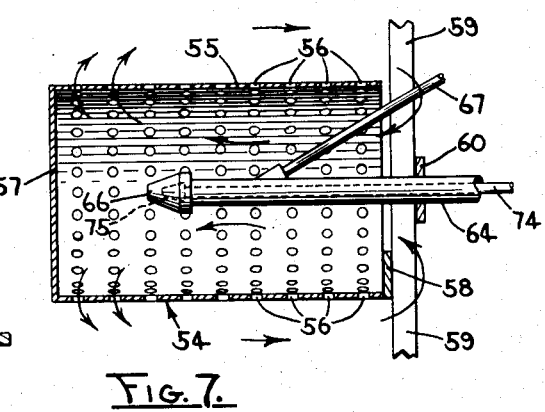
Fig. 7 is an enlarged vertical, longitudinal, sectional view through the heating unit of the crop heater.

The crop heater of the present invention is supported for portability on a trailer or the like indicated generally by the reference numeral 10. The trailer is provided with a horizontally located floor 11 which is movably supported on a pluraltiy of wheels 12 rotatably connected to the trailer and is adapted to be attached for forward movement to a prime mover such as a tractor or truck by means of a tongue 13 extending forwardly of the trailer.

The heater comprises a substantially cylindrical housing or casing which is preferably located longtiudinally of the trailer or other supporting structure and is provided with a forwardly converging frusto-conical constricted portion 16 at its forward end and a rearwardly converging somewhat frusto-conical constricted portion 17 at its rearward end. It is to be understood, that the constricted portion 16 need not be employed, the device being susceptible to successful operation upon the removal thereof and/or by the supplanting of the constricted portion by an air intake funnel. The constricted portion is employed primarily as a convenience in minimizing debris drawn into the heater and is not a critical structure. The constricted portion 17 has a nozzle effect in projecting and directing heated gases, as will subsequently become apparent. A pair of cylindrical, rearwardly and relatively transversely diverging outlet tubes 18 are attached and communicate with the constricted portion 17 at the rearward end of the housing for purposes of directing heated air discharged by the device. The cylindrical housing 15 is attached to the trailer floor 11 by means of a plurality of U-shaped strap metal brackets 19 which extend over the housing and embrace the sides of the housing and are attached at 20 to the floor of the trailer. The crop heater is conveniently supported on the trailer as shown and described but may also be conveniently supported for portability in any other desired manner.

Means are provided for impelling a current of air longitudinally through the interior of the housing 15 comprising a propeller or fan 23 rotatably supported on radially extending braces 24 which are secured at their outer ends to the inner surface of the housing 15 and at their inner ends are secured to a rectangular plate 25 in substantially right angular relation to the longitudinal axis of the housing. A spindle shaft 26 extends through an opening in the plate 25 and is secured to the plate and to the inner ends of the braces 24 as by welding or other convenient securing means. A sleeve 27 is rotatably mounted coaxially of the spindle shaft on a pair of frictionless bearings 28 located between the shaft and the sleeve. The sleeve is held endwardly on the spindle shaft by locating a washer 29 over the spindle shaft against one of the bearings 28 with a castellated nut 30 threadedly received on the outer end of the spindle shaft against the washer 29. The propeller 23 is attached to the sleeve 27 by providing a flange 32 integrally with the sleeve 27 with a hollow hub 33 having an integral flange 34 at one end thereof secured to the flange 32 on the sleeve 27 by means of a plurality of bolts 35 extending through the flange 34 and threadedly received into the flange 32. A flange 36 is formed integrally with the opposite end of the hub 33 and the propeller 23 is attached to the forward end of the hub 34 by means of a plurality of bolts 38 passing through the propeller hub and into the flange 36 on the hub. Thus the propeller 23 is rotatably mounted concentrically of the housing for axial movement of air therein in a location relatively near the forward end of the housing 15.

Means are provided for rotating the propeller comprising a multiple V pulley 42 which is located coaxially over the opposite end of the sleeve 27 and is keyed at 43 to the sleeve 27 for rotation therewith. A nut 44 is threadedly received on the sleeve 27 against the outer face of the recessed portion of the pulley 42 holding the pulley longitudinally of the sleeve 27. The outer end of the multiple pulley 42 and the sleeve 27 are sealed against entry of dirt by means of a circular plate located in circumscribing relation to the spindle shaft 26 and secured thereto as by welding and extending radially outwardly covering the space between the interior diameter of the sleeve and the spindle shaft and the joint between the pulley 42 and the sleeve 27.

The multiple pulley and consequently the propeller 23 are rotatably driven by providing an engine or motor 46 which is fixedly supported on a platform 47 secured to the upper sides of the horizontal portions of the U-shaped brackets 19. The motor 46 is covered with a shield or shroud 48 as protection against the elements and as a safety measure. A multiple V pulley 49 is attached to the drive shaft of the engine with multiple flexible belts 50 extending circuitously around both of the multiple pulleys 42 and 49 so that rotative motion from the drive shaft of the motor is transmitted to the propeller 23.

Air forced through the cylindrical housing 15 by operation of the propeller 23 moves in close proximity to a coaxially located longitudinally extending heating unit, indicated generally by the reference numeral 54. This heating unit is provided with a hollow cylindrical shell 55 made of sheet metal having a large number of perforations 56 formed therethrough communicating between the interior of the shell and the exterior thereof. The forward end of the cylindrical shell 55 is closed by means of a circular plate 57 welded or otherwise secured to its forward end. The shell 55 is supported concentrically of the cylindrical housing 15, longitudinally related thereto, by weldably securing a bar 58 against the rearward edge of the shell and horizontally along the lower portion thereof. The bar 58 is attached, as by welding, to and between a pair of a plurality of transversely radially extending braces 59 which are secured at their outer ends to the interior surface of the cylindrical housing 15 and at their inner ends are welded to a rectangular burner mounting plate 60. The cylindrical shell 55 is thus secured and supported on the radially extending braces 59 in a position coaxially and longitudinally of the cylinrical housing 15 with its closed end 57 located forwardly and its open end disposed rearwardly of the cylindrical housing 15.

With the cylindrical shell 55 positioned as described, the propeller 23 urges air through the housing and out the tubes 18 as shown by the arrows in Fig. 3. The positioning of the shell effects a constriction in the housing 15 circumjacent to the shell. Thus, immediately circumjacent to the shell is an area of reduced pressure incident to the Venturi effect of the passing of the air past the shell through the effected constriction. This reduced pressure effect assists in heating the air, as will be subsequently described, and results in a circulation of at least a portion of the air passing through the housing 15, in at the open rear end of the shell, and thence radially through the apertures therein, as shown.

An elongated, hollow burner tube 64 extends through an opening in the rectangular plate 60 and is weldably or otherwise secured therein and thus supported on the inner ends of the radially extending braces 59 in a position substantially concentrically of the cylindrical shell 55. The inner or forward end of the burner tube terminates an appreciable distance from the closed forward end 57 of the cylindrical shell 55 and a burner nozzle 66 is screw threadedly or otherwise attached to the forward end of the burner tube. An air conduit 67 is connected for communication with the interior of the burner tube 64 and at its opposite end is connected to a compressed air chamber 68 which is furnished with compressed air from an air compressor 69 fixedly mounted on the platform 47. The air compressor 69 is driven from the engine 46 by attaching a coupling 70 between the drive shaft of the motor and the shaft of the air compressor 69. Air under pressure is supplied from the air chamber 68 to the interior of the burner tube 64 or from any other suitable source.

A fuel conduit 74 is provided within the burner tube 64. A fuel nozzle 75 is secured to the forward end of the fuel conduit interiorly of the burner nozzle 66. The other end of the fuel conduit 74 is connected to a fuel container 76 so that fuel is gravitationally or pressure fed to the nozzle 75 from the tank 76. The tank 76 is securely mounted on the platform 47. With fuel fed from the fuel tank 76 to the nozzle 75 through the fuel conduit 74 and compressed air fed to the nozzle 76 from the compressed air chamber 68 through the air conduit 67, a very hot flame is obtained on ignition of the gaseous fuel emitted from the nozzle 66. This flame heats the cylindrical shell 55 and its closed end 57 to a red heat so that air moving adjacent and into the cylindrical shell is heated by radiant heat from the cylindrical shell and its closed end as well as by conducted heat from the flame.

*Operation*

The operation and utility of the present invention is believed to be apparent from the foregoing description and is briefly summarized at this point. The cylindrical housing 15 of the crop heater is securely supported on the wheel mounted trailer 10 so that the crop heater may be moved between rows of trees or crops by means of a tractor or truck connected to the tongue 13 of the trailer.

With the engine 46 in operation, the propeller 37 is rotated at a high speed, moving air longitudinally of the cylindrical housing 15, passing inwardly of the constricted front end portion 16 of the housing and outwardly of the constricted portion 17 and the transversely diverging outlets 18 at the rear end of the housing. As the air passes through the cylindrical housing it moves rearwardly and exteriorly of the shell 55 and thereafter a portion circulates radially inwardly of the rear end of the cylindrical shell 55 moving forwardly in the interior of the cylindrical shell. This air thereafter moves radially outwardly through the perforations 56 from the interior of the cylindrical shell 55 to the exterior thereof and rearwardly with rearwardly moving air exteriorly of the cylindrical shell. The path of the air moving through the cylindrical housing is indicated by the arrows in Fig. 3 of the drawing.

Air moving through the housing 15 under the impetus imparted thereto by the propeller 23 passes between the heating unit 54 and the circumjacent housing. At this point in the housing the transverse dimensions of the air passage are reduced by said heating unit and the velocity of air movement past the burning unit 54 is greater than the average air velocity in the housing 15. This results in a Venturi effect exteriorly of the heating unit, a lowering of the pressure exteriorly of said heating unit and a resultant beneficial effect on the burner. This effect and the projection of compressed air and fuel axially forwardly in the burning unit increases the proportion of air passing through the housing that is circulated through the burning unit which is conducive to burner efficiency and heat transfer from burning gases to transient air.

The crop heater as shown in the drawing and as described in the foregoing description is mobile for earth traversing movement through an orchard or field of crops to raise the temperature. The heater not only effectively and efficiently heats vast volumes of air but distributes such air over a large area and is quickly and easily movable to any location where needed. Not only does heating of the air tend to protect crops but air circulation of itself is beneficial.

Although we have herein shown and described our invention in what we have conceived to be the most practical and preferred embodiment, it is recognized that departures may be made therefrom within the scope of our invention, which is not to be limited to the details disclosed herein, but is to be accorded the full scope of the claims so as to embrace any and all equivalent devices and structures.

Having described our invention, what we claim as new and desire to secure by Letters Patent is:

1. A crop heater comprising an elongated cylindrical hollow housing supported longitudinally of a movable supporting device in substantial alignment with the direction of movement of the device, the housing having a forwardly convergent frusto-conical forward end portion defining a constricted opening and a rearwardly convergent frusto-conical rearward end portion, hollow cylindrical outlet tubes communicating with the rearward end portion of the housing and rearwardly and divergently extended therefrom, a fan rotatably supported coaxially of the housing, means for rotating the fan for moving air through the housing from its forward end toward its rearward end, a hollow sheet metal cylindrical heater shell supported coaxially of the housing having its forward end closed by a sheet metal disk extending transversely across the forward end of the shell and having a plurality of perforations pierced through the shell forming gaseous communication between the interior and exterior of the shell, and a burner located coaxially of the shell and directed forwardly thereof.

2. A crop heater comprising a substantially cylindrical housing having forward and rearward end portions and an air passage formed longitudinally therethrough, a propeller mounted concentrically within the housing adjacent the forward end portion, means for rotating the propeller in a direction forcing air rearwardly through the housing, a substantially cylindrical hollow perforated heating unit mounted concentrically within the housing intermediate the propeller and the rearward end portion of the housing and in conjunction with the housing restricting the air passage through the housing whereby Venturi effect of air impelled by the propeller reduces the air pressure circumjacent the housing, a heating jet positioned within the heating unit and forwardly directed, and means for imparting fuel under pressure to the burning jet whereby the fuel is projected forwardly in the heating unit.

3. A crop heater comprising an elongated hollow generally cylindrical housing supported for longitudinal earth traversing movement and in general axial alignment with the direction of said movement, a heating unit including a hollow generally cylindrical shell located coaxially of the housing and spaced from the housing periphery to form a generally annular restricted air passage between said housing and said shell, and means within said shell to heat said shell, a discharge chamber at the rearward end portion of said housing spaced from said shell, generally lateral outlets on the lower portion of said chamber below the level of said shell, a generally axial intake chamber on the forward end of the housing, and means generally axial to said housing to force air through said housing and out through said outlets.

4. A crop heater comprising an elongated holhol housing supported longitudinally of a movable supporting device in substantial axial alignment with the direction of movement of said device, the housing having a forward end defining an intake opening and rearward end portion defining a discharge chamber in general axial alignment with said intake opening, a plurality of outlet conduits extended from the lower portion of said discharge chamber divergently generally laterally, means for forcing air longitudinally of said housing, and means contained in the housing axially aligned with and between said intake opening and said discharge chamber and spaced from the inner periphery of said housing for heating the air as it moves longitudinally through said housing.

WILLIAM R. FOWLER, JR.
BOBBY R. McGILL.

References Cited in the file of this patent

UNITED STATES PATENTS

| Number | Name | Date |
|---|---|---|
| 1,357,314 | Cobb | Nov. 2, 1920 |
| 1,461,247 | Lingenfelter | July 10, 1923 |
| 1,793,719 | Reader | Feb. 24, 1931 |
| 2,153,900 | Taber | Apr. 11, 1939 |
| 2,154,002 | Kerrick | Apr. 11, 1939 |
| 2,477,584 | DeZubay | Aug. 2, 1949 |